United States Patent [19]

Shiokama et al.

[11] Patent Number: 4,525,053
[45] Date of Patent: Jun. 25, 1985

[54] MOTOR-DRIVABLE PHOTOGRAPHING LENS ASSEMBLY

[75] Inventors: Yoshiharu Shiokama; Shigeru Suzuki, both of Kawasaki, Japan

[73] Assignee: Nippon Kogaku K.K., Tokyo, Japan

[21] Appl. No.: 537,013

[22] Filed: Sep. 29, 1983

[30] Foreign Application Priority Data

May 10, 1982 [JP] Japan .......................... 57-150387[U]

[51] Int. Cl.³ .............................................. G03B 3/00
[52] U.S. Cl. .................................................... 354/400
[58] Field of Search ............ 354/400, 401, 402, 195.1, 354/5; 352/140

[56] References Cited

U.S. PATENT DOCUMENTS 4,067,031  1/1978  Enomoto .......................... 354/195.1
4,189,216  2/1980  Szabo ..................................... 354/5
4,191,460  3/1980  Fujiki ................................ 352/140
4,359,276  11/1982 Tomori ............................... 354/400

Primary Examiner—Russell E. Adams
Attorney, Agent, or Firm—Fitzpatrick, Cella, Harper & Scinto

[57] ABSTRACT

A photographing lens assembly is provided with a moving lens system which is movable within a given moving range to change the optical characteristics and an electrical driving apparatus for controlling the movement of the moving lens system and comprises a mechanical limiting device and an electrical limiting device. The mechanical limiting device is adapted to act on the moving lens system when this system has been moved up to the limit of the moving range in order to inhibit any further movement of the lens system beyond that limit. The electrical limiting device is adapted to act on the electric driving apparatus when the moving lens system reaches a position a determined amount before the limit of the given moving range in order to inhibit the control for further moving the lens system in the same direction by the electric driving apparatus.

7 Claims, 10 Drawing Figures

MOTOR-DRIVABLE PHOTOGRAPHING LENS ASSEMBLY

BACKGROUND OF THE INVENTION

1. Field of the Invention

The present invention relates to a photographing lens assembly provided with a motor-driven focusing device of the type in which an optical system, especially a focusing optical system, is moved by a motor for focus adjustment.

2. Description of the Prior Art

There is widely known and used such a photographing lens assembly provided with a driving mechanism for automatic focus adjustment. The driving mechanism generally includes a motor the rotation of which is controlled by a focus deviation signal coming from a focus detector for detecting the existing deviation of the image plane from the focal plane of the camera. The deviation of the image plane on which an image of the object is now being formed is detected electrically by the focus detector. In response to the deviation signal issued from the detector, the rotation of the motor is controlled, and in link with the rotation of the motor the driving mechanism moves the focusing optical system.

In this type of photographing lens assembly, the motor-driven focus adjustment mechanism becomes inactive when the power source battery for the motor is consumed or when the object to be taken is a very unique one (such as flat scene or smoke) for which the detection by the focus detector becomes very difficult.

In order to accommodate the lens assembly also to such cases, the applicants of the present patent application has already proposed a photographing lens assembly provided with not only the above-mentioned motor-driven automatic focus adjustment mechanism but also a manually operable focus adjustment mechanism. The user can select any desired one of the automatic focusing mechanism and the manual focusing mechanism independently of each other by a change-over operation. This photographing lens assembly is disclosed in the specification of U.S. patent application Ser. No. 296,142 filed on Aug. 25, 1981.

In general the manual focusing mechanism of photographing lens assembly is constructed in such manner that the moving range of the focusing optical system manually driven is limited between two end points and any further movement of the focusing system beyond the end points can be inhibited by mechanical limiting means. One of the limit end points lies at the position corresponding to the in-focus position to an object at infinity and the other limit end point lies at the position corresponding to the in-focus position to an object at the minimum object distance.

For the motor-driven automatic focus adjustment mechanism also it is desirable that the moving range of the focusing optical system be limited similarly to the above. This may be attained, preferably, by cutting off the power supply to the motor to stop the rotation or by switching over the direction of current flow to the motor to reverse the rotation of the motor when the focusing optical system reaches either limit end of the moving range.

Therefore, in case of the above-mentioned type of photographing lens assembly provided with both of manual and mechanical focusing mechanisms, it is required to provide both of mechanical limiting means and electrical limiting means for limiting the movement of the focusing optical system. This brings about some difficult problems. In particular when the automatic driving mechanism is selected for focus adjustment, both of mechanical limiting means and electrical limiting means are actuated at the same time at each the limit end point of the moving range of the focusing optical system. Consequently, the focusing optical system and its related mechanism being driven by the motor are subjected to impact force by said mechanical limiting means. The impact force causes the focusing optical and its related mechanism to move back and makes it difficult to stop the focusing optical system at the limit end point.

A solution to the problem is disclosed in Japanese Application for Utility Model Patent laid-open No. 51905/1982. According to the solution, a braking means is provided to moderate the shock at stopping. The braking means comprises a leaf spring which is applied to the moving member related to the focusing optical system when the latter comes near the limit end of the moving range so that the moving member can be impacted against the mechanical stopper with a reduced shock.

However, this known solution has some drawbacks.

To further move the moving member against the pressing force of the leaf spring a great deal of energy is required. To maintain the proper operability for focus adjustment the pressing force by the braking leaf spring must be very precisely set and adjusted. In practice it is very difficult to always correctly stop the focusing optical system just at the end point of the moving area without any loss of the easy operability employing this solution.

SUMMARY OF THE INVENTION

Accordingly the object of the present invention is to provide a photographing lens assembly provided with an automatic driving mechanism which assures smooth stop and reversion of the movement of the focusing optical system at each limit end point of its moving range without any loss of the proper operability of the focus adjustment mechanism.

According to the present invention, the above object is attained by the provision of mechanical limiting means and electrical limiting means at different positions in the direction of the moving course of a moving member interlocked with the focusing optical system. Said mechanical limiting means is actuated after the actuation of said electric limiting means. More concretely, on the infinity side, said mechanical limiting means is located at a position beyond the actuation point of said electrical limiting means a further distance toward the infinity side. On the minimum object distance side, said mechanical limiting means is located at a position beyond the actuation point of said electrical limiting means a further distance toward the minimum object distance side. Preferably the distance from the actuation point of said electrical limiting means is so selected that the moving member responsive to said electrical means can come to contact with said mechanical limiting means and stop without any substantial shock or the moving member can stop without contact with said mechanical limiting means.

Other and further objects, features and advantages of the present invention will appear more fully from the following description of preferred embodiments taken in connection with the accompanying drawings.

BRIEF DESCRIPTION OF THE DRAWINGS

FIG. 5 illustrates the positional relationship between mechanical limiting means and electrical limiting means in which

DESCRIPTION OF THE PREFERRED EMBODIMENTS

Figure 1:
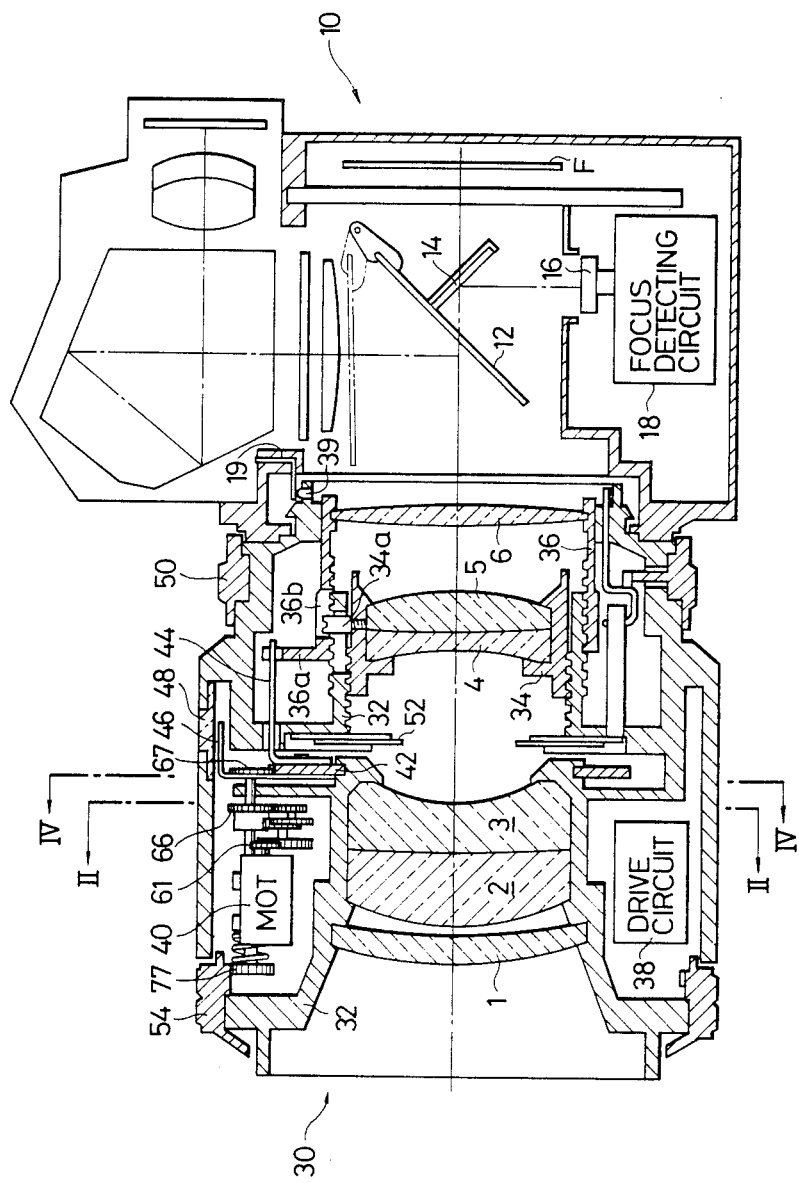
FIG. 1 is a sectional view of a single lens reflex camera showing an embodiment of the invention.

Referring to FIG. 1 showing an embodiment of the invention, an auto-focus photographing lens assembly 30 and a single-lens reflex camera body 10 are joined together. The lens assembly 30 includes a photographing lens system comprising lenses 1, 2, 3 held in a stationary tube 32 and focusing lenses 4, 5, 6 held in moving tubes 34, 36. The focusing lenses are moved along the optical axis for focus adjustment. A part of the light transmitted through the optical system is reflected toward a finder optical system by a turn mirror 12 in the camera body 10. Another part of the transmitted light passes through the turn mirror and then it is reflected by a sub-mirror 16 which directs the light to a photo sensor device 16 on the bottom surface of the camera body. The photo sensor device 16 is positioned at a position optically equivalent to the film plane F. The output of the sensor 16 is introduced into a focus detecting circuit 18 which generates a detection signal. The photo sensor device 16 and the detecting circuit 18 constitute a known focus detecting apparatus. The detection signal is a signal informing of the positional relationship of the object image formed by the photographing lens to the film plane. The apparatus for generating such detection signal is well-known to those skilled in the art and consequently will not be described in detail.

The detection signal is transmitted to a drive circuit 38 in the lens assembly through connector contacts 19 and 38 which are provided on the connecting mount of the camera body and on the connecting mount of the lens assembly respectively. In response to the detection signal the drive circuit 38 controls the forward and reverse rotation of the motor 40 and also the stop thereof. The rotation of the motor 40 is transmitted to a rotating member 42 through a gear train. The rotating member 42 is rotatable around the stationary lens tube so that the rotary member 42 is rotated about the optical axis with the rotation of the motor 40.

The rotating member 42 has an arm 44 fixed thereto. Through the arm the rotation of the rotary member 42 is transmitted to the moving lens tube 36. The tube 36 has a projection 36a and a linear cam slot 36b in the direction of the optical axis. Further, the inner circumferential surface of the moving tube 36 is thread-engaged with a helicoid screw on the outer circumferential surface of the stationary tube 32.

The rotation of the moving tube 36 is transmitted to the moving tube 34 through a pin 34a engaged in the above-mentioned cam slot 36b. The moving tube 32 has, on its outer circumferential surface, a thread which is in engagement with a helicoid screw provided on the inner circumferential surface of the stationary tube 32. The inner helicoid screw and the above-mentioned outer helicoid screw of the stationary tube 32 have different leads. Therefore, when the rotation of the rotating member 42 is transmitted through the arm 44, the moving tubes 36 and 34 start a relative movement along the optical axis while rotating. As a result, the image plane of the image-forming optical system is moved. At the time when the image plane comes into coincidence with the film plane F, the focus detector generates an in-focus signal. In response to the signal, the drive circuit 38 stops the rotation of the motor 40. In this manner, an automatic focus adjustment is effected. The rotating member 42 has a display plate 46 fixed thereon. An object distance scale is marked on the display plate so that the user can read the object distance in the state of in-focus through a display window 48.

On the outer circumferential surface of the stationary tube 32 there are provided also a diaphragm setting ring 50 for adjustment of diaphragm mechanism 52, a focusing ring 54 for manual focusing operation and a mode change-over knob 56.

Figure 2:
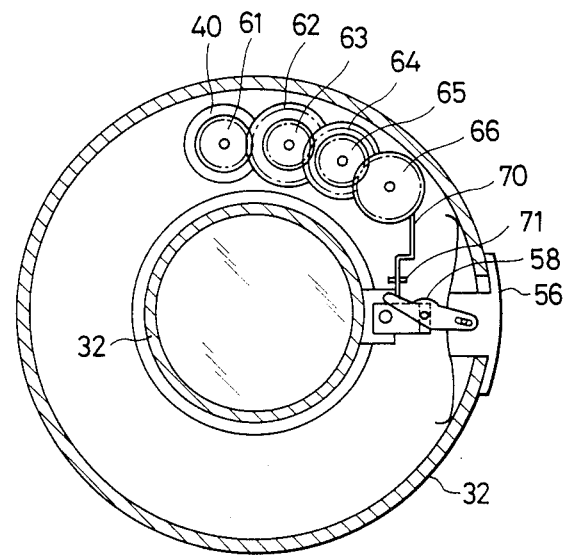
FIG. 2 is a sectional view taken along the line II—II in FIG. 1.
Figure 3:
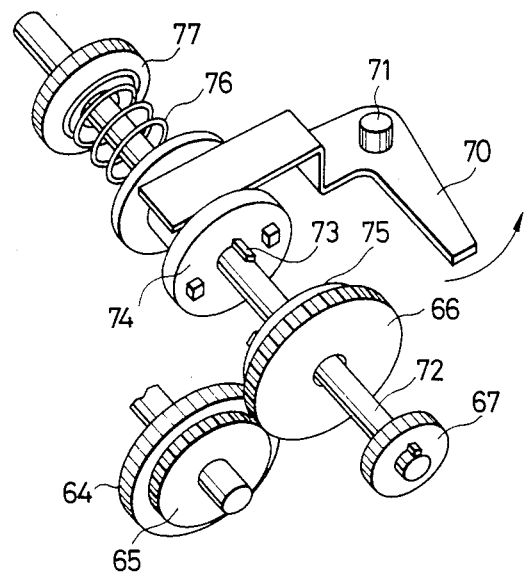
FIG. 3 is a perspective view of the change-over mechanism in the embodiment.

FIGS. 2 and 3 show the detailed structure of a change-over mechanism which includes a transmission gear train 61 to 67 between the motor 40 and the rotating member 42 and the mode change-over knob 56.

The user can select any desired one of automatic driving mechanism and manual driving mechanism by slide-moving the change-over knob 56 in the circumferential direction. When the knob 56 is slide-moved to select the manual driving mechanism, a clutch lever 70 is rotated about a pin 71 through a lever 58. By this rotation of the clutch lever 70 a moving clutch plate 74 is moved along a shaft 72 having a key 73 and disengaged from a rotary clutch plate 75 fixed to the gear 66 as shown in FIG. 3. The gear 66 with the clutch plate 75 is mounted rotatably about the shaft 72. Therefore, after the clutch plate 73 has been disengaged from the clutch plate 75 in the manner described above, the rotation of the gear 66 by the motor 40 is not transmitted to the shaft 72. Consequently, the rotation of the motor can not be transmitted to the rotating member 42 in mesh with a gear fixedly mounted on the shaft 72. Thus, in this position of the mechanism, the automatic focusing operation by the automatic driving mechanism previously described can not be performed at all.

On the other hand, the clutch plate 74 disengaged from the clutch plate 74 is friction-coupled with a gear 77 through a friction spring 76. The gear 77 is mounted on the shaft 72 rotatably about it and is in mesh with an internal gear of the focusing ring 54. Therefore, when the ring is manually rotated for focusing, the rotation of the focusing ring 54 is transmitted to the shaft 72 through gear 77, spring 76 and clutch disc 74. As the shaft 72 is rotated, the rotating member 42 is rotated by it through the gear 67. In this manner, a manual focusing by the manual driving mechanism can be performed.

By turning the mode change-over knob 56 back to its starting position, the clutch lever 70 is rotated in the direction of the arrow in FIG. 3 and at the same time the clutch plate 74 slide-moves on and along the shaft 74 by the biasing force of the friction spring 76 toward the clutch plate 75. Thus, the clutch discs 74 and 75 are coupled together again. In this position, the rotation of the motor can be transmitted to the shaft 72 through the clutch discs 74, 75 to rotate the rotating member 42 through the gear 67. Therefore, the automatic driving mechanism is operable for automatic focusing. Since the friction spring 76 is now in the state of full extension and its biasing force is almost completely lost, the friction coupling between the clutch disc 74 and the gear 77 is dismissed in this position.

Figure 4:
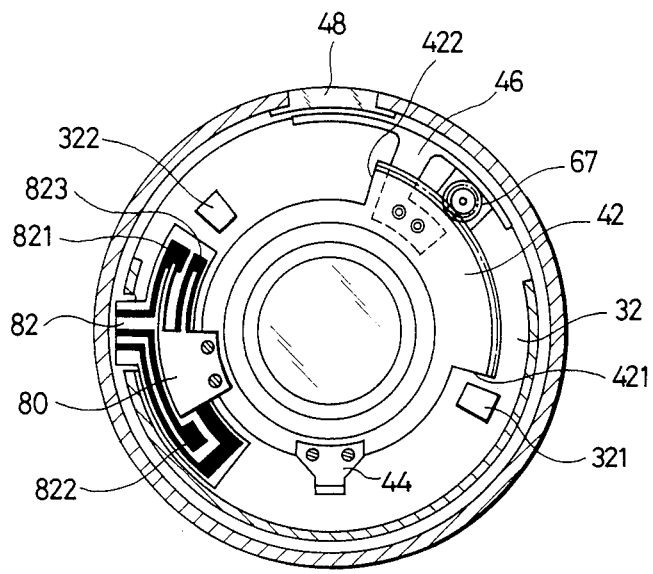
FIG. 4 is a sectional view taken along the line IV—IV in FIG. 1.

As shown in FIG. 4, on the surface of the stationary tube 32 facing the rotating member 42 there are formed two rotation limiting projections 321 and 322 projecting in the direction of the optical axis. On the other hand, the rotating member 42 has two rotation limiting ends 421 and 422 engageable with the projections 321 and 322 on the stationary tube. The rotation of the rotating member 42 is mechanically limited by the engagement of the limiting projections 321, 322 with the limiting ends 421, 422.

The rotating member 42 has a limit signal generating brush 80 fixed thereto. With the rotation of the rotating member 42 the brush 80 slides on a land formed on a flexible print circuit board 82 which is in turn fixed to the stationary tube 32. The brush generates a limit signal according to the pattern of the land on which the brush slides. More concretely, at the limit position on the infinity side of the moving range for the focusing lens, the brush 80 short-circuits the conductor pattern layers 821 and 823. At the limit position on the minimum object distance side the brush short-circuits the conductor pattern layers 822 and 823 on the flexible print board. The pattern layer 823 is connected to the drive circuit 38. The pattern layers 821 and 822 have a certain determined potential applied thereto respectively. Therefore, at the respective limit positions on the infinity side and on the minimum distance side there is generated a signal of the determined potential on the pattern layer 823. In response to the signal the drive circuit 38 reverses or stops the rotation of the motor. In this manner, an electric limiting of rotation is achieved.

FIGS. 5A to 5E illustrate the relationship in position between mechanical rotation limiting and electric rotation limiting.

Figure 5A:
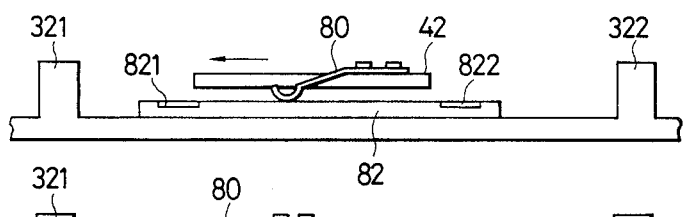
FIG. 5A shows the position within the rotation range.
Figure 5B:
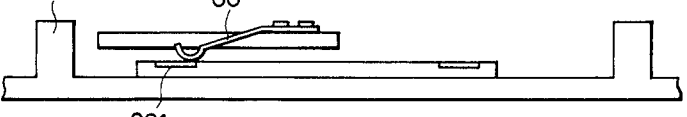
FIGS. 5B and 5D show the positions for actuation of electrical limiting means and FIGS. 5C and 5E show the positions for actuation of mechanical limiting means.

Referring to FIG. 5A, the rotating member 42 is now rotationally moving toward the infinity side. Before the rotating member runs against the rotation limiting projection 321, the brush 80 comes into contact with the conductor pattern layer 821 as shown in Figure 5B. At this time, therefore, an electric limiting operation is executed. Assuming that the mode change-over knob 56 is now in the position to select the automatic driving mechanism, the drive circuit 38 will operate so as to stop or reverse the rotation of the motor at the time.

Even after the actuation of the electric limiting, the rotating member 42 with the brush 80 continue moving owing to the inertia force of the motor, thus moving the optical system etc. while decreasing the speed rapidly. Nearly at the position shown in FIG. 5C, that is, when the rotating member 42 comes into contact with the projection 321 or immediately before the contact, the rotating member stops.

Figure 5C:
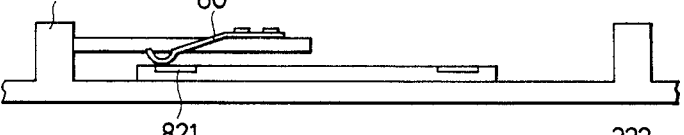
Figure 5D:
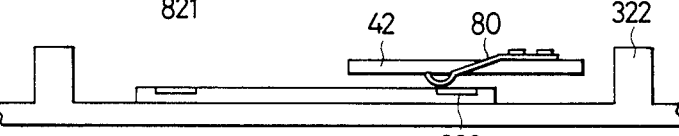
Figure 5E:
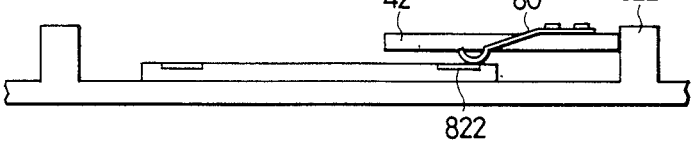

Similarly, on the minimum object distance side as shown in FIGS. 5D and 5E, the rotating member 42 moves further after the brush 80 has short-circuited the conductor patterns 822 and 823 and stops when or immediately before it comes into contact with the projection 322.

In order to stabilize the generation of the electric limiting signal it is advisable that the width of the conductor pattern layers and the positions of the pattern layers relative to the brush be determined in such manner that in the positions shown in FIGS. 5C and 5E in which the rotating member 42 is in engagement with the projection 321 or 322, the brush 80 still remains in contact with the conductor pattern layer 821 or 822.

As for the position at which the photographing lens is precisely focused to the object at infinity or at the minimum object distance, it is desirable that the position be set to such a position which lies some distance before the engagement of the rotating member 42 with the projection 321 or 322 and at which the electric limiting operation is started. The reason for this is that the optical performance of the optical system is variable depending on temperature change and/or other factors. However, taking the depth of focus into consideration, the position may be set in front of or behind the desirable position.

Figure 6:
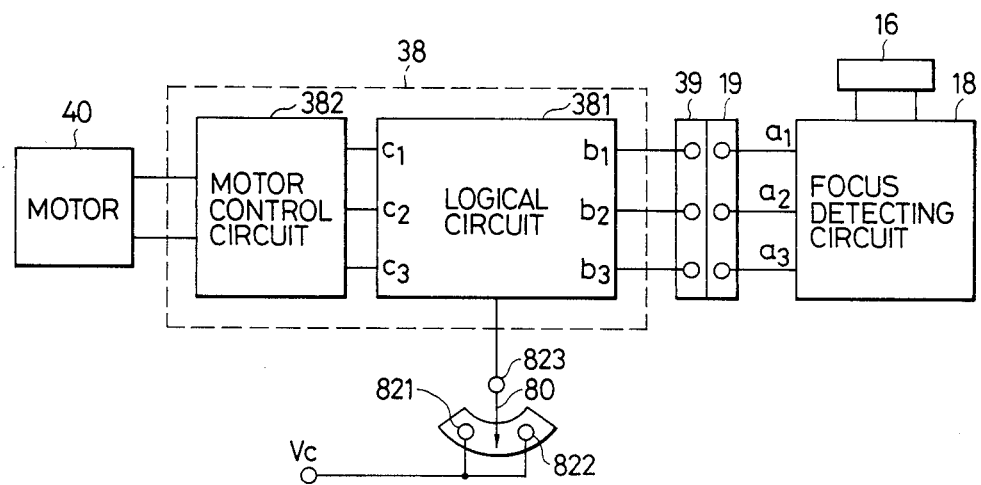
FIG. 6 is a block diagram showing the connection of electric circuits in the embodiment.

FIG. 6 diagramatically shows the connection of electrical circuits in the embodiment.

The focus detecting circuit 18 has three output terminals $a_1$, $a_2$ and $a_3$. When the object image formed by the image-forming optical system is deviated from the film plane toward one side, the output terminal $a_1$ has a low level signal and $a_2$ and $a_3$ have a high level signal. When the object image is deviated toward the other side, the output terminal $a_2$ has a low level signal and $a_1$ and $a_3$ have a high level signal. When a coincidence is obtained between the formed image and the film plane, the output terminal $a_3$ has a low level signal.

The drive circuit 38 is constituted of a logical circuit 381 and a motor control circuit 382. Normally the logical circuit 381 outputs from its output terminals $c_1$, $c_2$ and $c_3$ signals having the same content as the input signals to its input terminals $b_1$, $b_2$ and $b_3$ have. However, when a limiting signal generated by the above-mentioned brush 80 and print circuit board 82 is introduced into it, the logical circuit 381 inverts some of the input terminals $b_1$, $b_2$, $b_3$ in response to the limiting signal and outputs from the output terminals $c_1$, $c_2$, $c_3$ such signals partly changed. For example, in response to the limiting signal the logical circuit interchanges the contents of the input terminals $b_1$ and $b_2$ and transmits the interchanged contents to the output terminals $c_1$ and $c_2$, or the logical circuit inverts the content of the input terminal $b_3$ when it is of high level and then transmits the inverted content to the output terminal $c_3$.

The motor control circuit 382 drives the motor 40 in forward direction when low, high and high signals appear at the output terminals $c_1$, $c_2$ and $c_3$ of the logical circuit respectively. When there appear high, low and high signals at the output terminals $c_1$, $c_2$ and $c_3$ respectively, the control circuit reverses the rotation of the motor 40. When a low level signal is generated at the output terminal $c_3$, the control circuit stops the motor 40. Such a circuit which functions in this manner is known, for example, from the specification of U.S. Pat. No. 4,319,171.

While there has been described a preferred embodiment of the invention, obviously modifications and variations are possible in light of the above teachings. It is therefore to be understood that within the scope of the appended claims, the invention may be practiced otherwise than as specifically described.

We claim:

1. A photographing lens assembly provided with a moving lens system which is movable within a given moving range to change the optical characteristics and the movement of which is controlled by an electrical driving apparatus, said lens assembly comprising:
   (a) mechanical limiting means which acts on said moving lens system when said lens system has been moved up to the limit of the moving range in order to inhibit any further movement of said lens system beyond said limit; and
   (b) electrical limiting means including means for producing an electrical signal when said moving lens system movable by said electrical driving apparatus reaches a position lying a determined amount before the limit of said given moving range and electric circuit means for inhibiting the control for further moving said lens system in the same direction by said electric driving apparatus.

2. A photographing lens assembly as set forth in claim 1, wherein said electrical signal producing means includes electric switch means which is operated when said moving lens system reaches said position lying the determined amount before the limit of the moving range and wherein said electric driving apparatus includes an electric motor and a drive circuit means for driving said motor, and said drive circuit means stops said motor in response to said electric switch means.

3. A photographing lens assembly as set forth in claim 1, wherein said electric limiting means acts on said electric driving apparatus in such manner that after the control of said electric driving apparatus has been inhibited said moving lens system being moved by inertia force can stop before it reaches the limit of said given moving range.

4. A photographing lens assembly as set forth in claim 1, which further comprises a stationary member and a moving member provided on said stationary member and interlocked with said moving lens system and wherein said mechanical limiting means includes a limiter provided on said stationary member at a position where said limiter is engageable with said moving member, and said electric signal producing means includes an electric switch means having a first contact provided on said stationary member and a second contact provided on said moving member for contact with said first contact.

5. A photographing lens assembly as set forth in claim 1, wherein said moving lens system includes a focusing lens system to be moved for focus adjustment to an object.

6. A photographing lens assembly as set forth in claim 5, wherein said electric limiting means is so formed as to act on said electric driving apparatus when said focusing lens system is moved beyond the range between the in-focus position to the object at infinity and the in-focus position to the object at the minimum object distance.

7. A photographing lens assembly as set forth in claim 1, which further comprises a stationary member and a moving member provided on said stationary member and interlocked with said moving lens system and wherein said mechanical limiting means includes a pair of limiters provided on said stationary member at a position where said limiters are engageable with said moving member, said moving member is moved between said limiters, and said electric limiting means includes a pair of electric switches operated by said moving member and provided on said stationary member at a position on the inside of said pair of limiters.

* * * * *